(12) United States Patent
Sung

(10) Patent No.: US 12,572,600 B2
(45) Date of Patent: **\*Mar. 10, 2026**

(54) SYSTEMS AND METHODS FOR FULL LATERAL TRAVERSAL ACROSS LAYERS OF A TREE-BASED REPRESENTATION

(71) Applicant: Illuscio, Inc., Culver City, CA (US)

(72) Inventor: Tim Sung, Los Angeles, CA (US)

(73) Assignee: Miris, Inc., Culver City, CA (US)

( * ) Notice: Subject to any disclaimer, the term of this patent is extended or adjusted under 35 U.S.C. 154(b) by 24 days.

This patent is subject to a terminal disclaimer.

(21) Appl. No.: 18/406,735

(22) Filed: Jan. 8, 2024

(65) Prior Publication Data

US 2025/0045333 A1      Feb. 6, 2025

Related U.S. Application Data

(63) Continuation of application No. 18/362,149, filed on Jul. 31, 2023, now Pat. No. 11,914,649.

(51) Int. Cl.
G06F 16/901       (2019.01)
G06F 16/903       (2019.01)

(52) U.S. Cl.
CPC ...... G06F 16/9027 (2019.01); G06F 16/9024 (2019.01); G06F 16/90335 (2019.01)

(58) Field of Classification Search
None
See application file for complete search history.

(56) References Cited

U.S. PATENT DOCUMENTS

| | | | | |
|---|---|---|---|---|
| 6,711,562 B1 * | 3/2004 | Ross | ................... | G06F 16/2246 |
| | | | | 707/999.2 |
| 2002/0184231 A1 * | 12/2002 | Baskins | .............. | G06F 16/9027 |
| | | | | 707/999.102 |
| 2010/0306222 A1 * | 12/2010 | Freedman | ........... | G06F 16/9014 |
| | | | | 707/769 |
| 2019/0035138 A1 | 1/2019 | Fuetterling | | |
| 2020/0211268 A1 | 7/2020 | Vaidyanathan et al. | | |
| 2021/0295463 A1 | 9/2021 | Mandal et al. | | |

* cited by examiner

*Primary Examiner* — Umar Mian
(74) *Attorney, Agent, or Firm* — Ansari Katiraei LLP; Arman Katiraei; Sadiq Ansari

(57)          ABSTRACT

Disclosed is an encoding system and associated methods for generating a graph-integrated tree-based representation of data that provides for direct lateral traversals of nodes in a each layer of the tree-based representation. The encoding system organizes data from a dataset to a tree-based representation with multiple layers and multiple nodes in each layer. The encoding system detects the nodes in each layer, and defines a graph structure that links the nodes in each layer for direct lateral access. The encoding system searches the tree-based representation in response to a query for a particular subset of the data by performing a single downward traversal to a particular layer with individual nodes that satisfy part of the query, and by laterally traversing the nodes in the particular layer using the graph structure to directly access a second node in the particular layer from a first node in the particular layer.

20 Claims, 10 Drawing Sheets

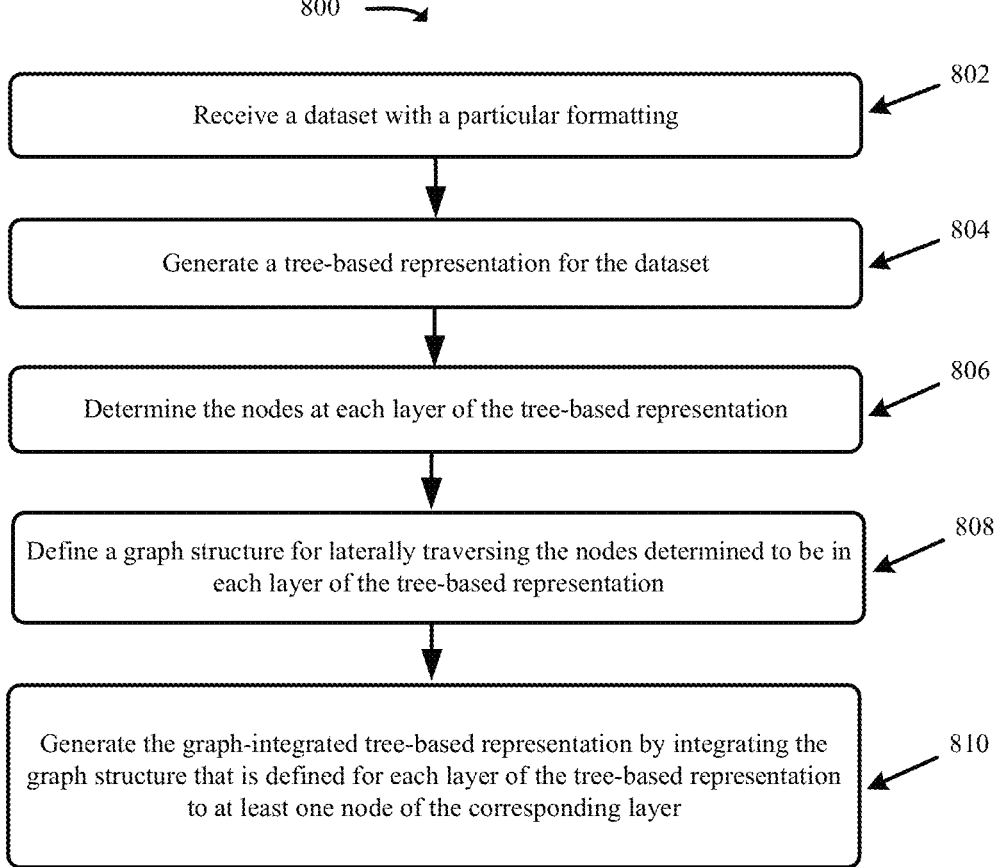

800

Receive a dataset with a particular formatting — 802

Generate a tree-based representation for the dataset — 804

Determine the nodes at each layer of the tree-based representation — 806

Define a graph structure for laterally traversing the nodes determined to be in each layer of the tree-based representation — 808

Generate the graph-integrated tree-based representation by integrating the graph structure that is defined for each layer of the tree-based representation to at least one node of the corresponding layer — 810

FIG. 8

Select (X1,Y1,Z1) to (X2,Y2,Z2)

SYSTEMS AND METHODS FOR FULL LATERAL TRAVERSAL ACROSS LAYERS OF A TREE-BASED REPRESENTATION

CLAIM OF BENEFIT TO RELATED APPLICATIONS

This application is a continuation of U.S. nonprovisional application Ser. No. 18/362,149 with the title "Systems and Methods for Full Lateral Traversal Across Layers of a Tree-Based Representation", filed Jul. 31, 2023. The contents of application Ser. No. 18/362,149 are hereby incorporated by reference.

BACKGROUND

Data may be hierarchically organized to a tree-based representation. Octrees, binary trees, and K-dimensional ("KD") trees are examples of different tree-based representations for hierarchically organizing data.

The hierarchical organization provides ordered access to the data. For instance, breadth-first search and depth-first search are different techniques for traversing a tree structure in order to locate specific data at different layers of the tree.

Access to data organized in any such tree structure is restricted by the linkages between the nodes of the tree. For instance, direct lateral traversals between children nodes in the same layer of a tree are not permitted because the linkages connect the children nodes to the same or different parent nodes rather than to each other. A lateral traversal is therefore performed by one or more upward traversals from a first child node in a particular layer of the tree to one or more parent nodes that are linked to that first child node followed by different downward traversals from the one or more parent nodes until ultimately reaching a second child node in the same particular layer of the tree. This manner of accessing data in the same layer of a tree is slow and is affected by the number of layers in the tree. Consequently, searching an octree or similar tree-based representation may have a time complexity of O(log N).

BRIEF DESCRIPTION OF THE DRAWINGS

FIG. 8 presents a process for generating a tree-based representation of a 3D model in which the nodes at any particular layer are laterally traversable in accordance with some embodiments presented herein.

DETAILED DESCRIPTION OF PREFERRED EMBODIMENTS

The following detailed description refers to the accompanying drawings. The same reference numbers in different drawings may identify the same or similar elements.

Provided are systems and associated methods for encoding a tree-based representation for full and direct lateral traversal across any hierarchical layer of the tree-based representation. The systems and methods include an encoder that creates a graph-integrated tree-based representation. Specifically, the encoder defines a graph structure for the nodes in each layer of the tree-based representation, and integrates the graph structure in one or more nodes at each layer of the tree-based representation. The graph structure provides pointers, indices, hash maps, and/or other references for traversing between nodes in a given layer even when the nodes are linked to the same or different parent nodes in a higher layer of the tree-based representation. Moreover, the graph structure allows for the direct traversal of the nodes in the same particular layer without having to perform any vertical (e.g., upwards or downwards) traversals of the tree-based representation once a first node of the particular layer is accessed.

The graph structure provides a faster alternative to breadth-first search, depth-first search, and/or linkage restricted tree traversals. Specifically, integrating the graph structure with the tree-based representation results in searches and/or data accesses at any depth or lateral position within the tree-based representation being completed in O(1) time or with a O(1) time complexity.

Figure 1:
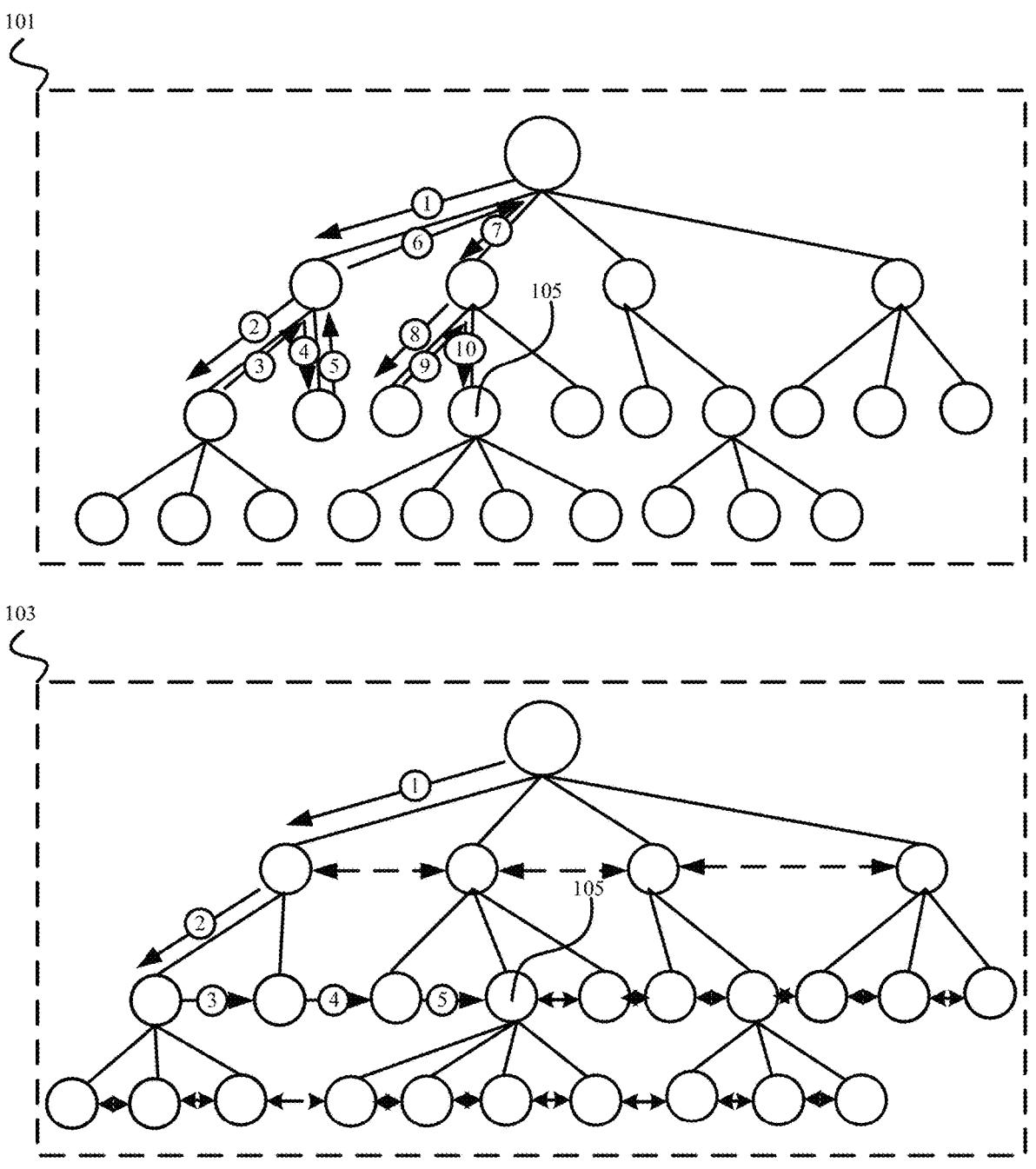
FIG. 1 illustrates an example of accessing the same node with traversals of a tree-based representation and a graph-integrated tree-based representation in accordance with some embodiments.

FIG. 1 illustrates an example of accessing the same node with traversals of tree-based representation 101 and graph-integrated tree-based representation 103 in accordance with some embodiments. Specifically, FIG. 1 is provided to illustrate the efficiencies of graph-integrated tree-based representation 103 relative to traditional tree-based representation 101.

Desired node 105 is located in the third layer of each tree 101 and 103 and is the fourth node in the hierarchical organization of the third layer. In some embodiments, the query that is specified for selecting desired node 105 contains search criteria that corresponds to the third layer of each tree 101 and 103 without directly identifying the fourth node in the third layer. For example, the query may request data for a region of a particular size in a 3D model with each node in the third layer corresponding to different regions in the 3D model that are of the particular size. As another example, the query may request data that is indirectly or directly linked to one node in the third layer.

Searching tree-based representation 101 with any of the available tree traversal techniques includes multiple up and down traversals of tree-based representation 101 to search laterally within the any layer. For instance, a depth-first search technique will traverse down from the root node to a first parent node and perform down and up traversals of the children nodes that are linked to the first parent node. After determining that desired node 105 is not a child node of the first parent node, the depth-first search reverts back to the root node, traverses down from the root node to a second parent node, and performs the down and up traversals until desired node 105 is detected as a child node of the second parent node.

Searching graph-integrated tree-based representation 103 includes a single downward traversal from the root node to a first child node in the third layer. As noted above, the query that is specified for selecting desired node 105 may identify a region, an amount of data, data at a particular resolution, data at a particular level-of-detail, a subset of constructs or data that correspond to leaf node directly or indirectly connected to a node in the third layer, and/or other criteria that is associated with the data stored by the nodes at the third layer.

The first child node in the third layer may be associated with a graph structure that links the first child node in the third layer with other children nodes in the third layer. The other children node in the third layer may be linked to the same or different parent nodes than the first child node. Accordingly, searching graph-integrated tree-based representation 103 includes performing a lateral search of the children nodes in the third layer using the pointers, indices, or other references of the graph structure defined for the third layer until desired node 105 is accessed.

Graph-integrated tree-based representation 103 may define a hierarchical organization for different files or data types. In some embodiments, graph-integrated tree-based representation 103 is used to hierarchically encode data that is distributed across a three-dimensional ("3D") space. In some such embodiments, the nodes at each lower layer of graph-integrated tree-based representation 103 may represent the data within smaller and smaller partitioned regions of the 3D space with the leaf nodes representing individual data points or individual constructs that collectively form a 3D model of one or more objects in the 3D space. Accordingly, graph-integrated tree-based representation 103 may encode a point cloud, mesh model, or other 3D format with the leaf nodes corresponding to individual points of the point cloud, individual triangles, polygons, or meshes of the mesh model, and/or other constructs of the 3D format.

The nodes that are directly or indirectly linked to two or more leaf nodes may represent the region spanned by the two or more leaf nodes or the data of the two or more leaf nodes at a lower level-of-detail, quality, or resolution. For instance, a parent node may define a single mesh that has the same shape, size, and form as two or more meshes represented by the two or more leaf nodes that are directly or indirectly linked to that parent node in graph-integrated tree-based representation 103.

Figure 2:
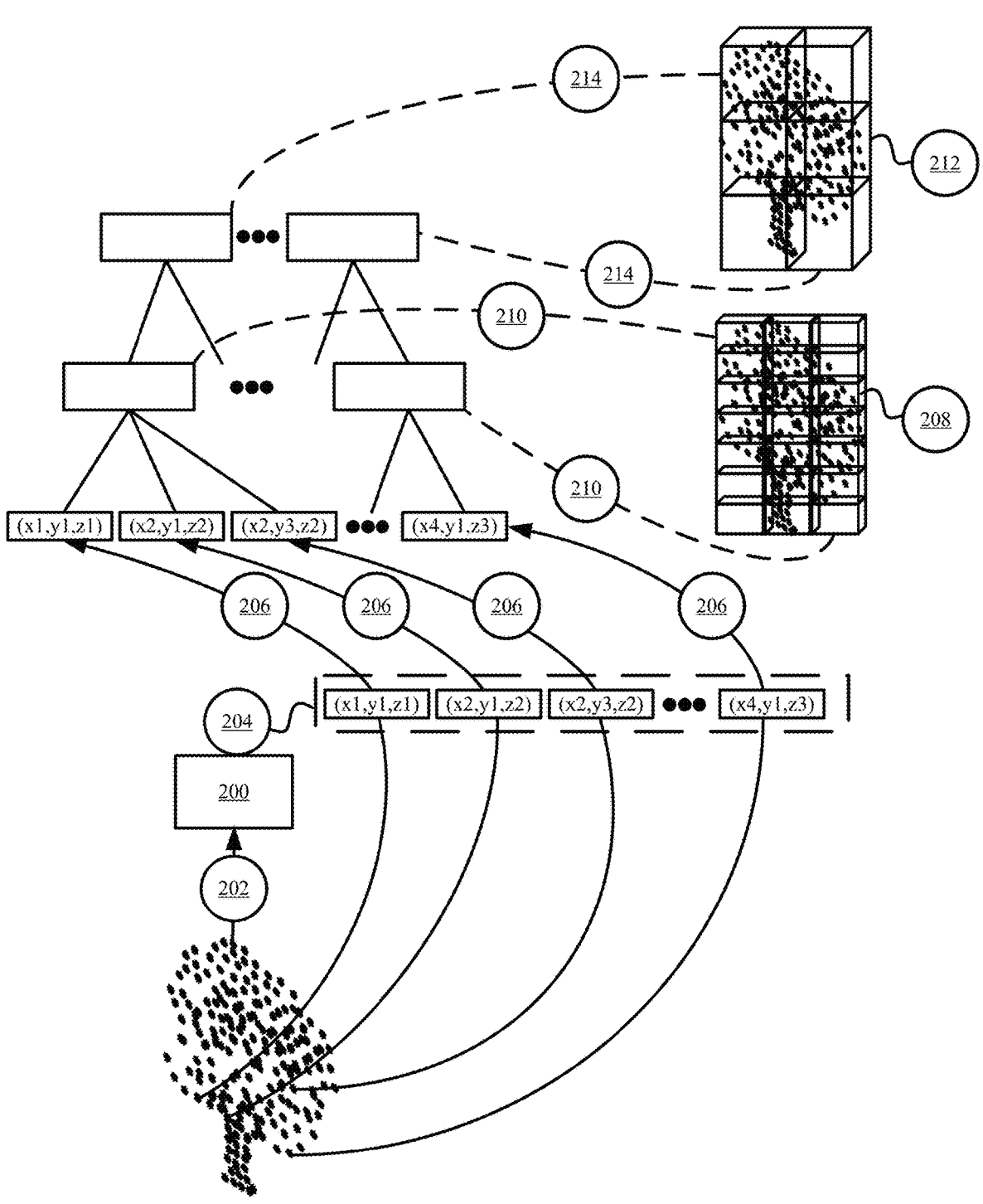
FIG. 2 illustrates an example of encoding a tree-based representation for a three-dimensional ("3D") model in accordance with some embodiments presented herein.

FIG. 2 illustrates an example of encoding a tree-based representation for a 3D model in accordance with some embodiments presented herein. Encoder 200 obtains (at 202) the data for the constructs that form or create the 3D model. The constructs may correspond to points, triangles, polygons, or meshes that collectively create a 3D object. The construct data may include positional data such as x, y, and z coordinates for the positioning of each construct in the 3D space spanned by the 3D model. The construct data may also include non-positional data including color values and/or other visual characteristics for each construct.

Encoder 200 organizes (at 204) the constructs based on the positional data, non-positional data, and/or relationships or commonality amongst the construct data. For instance, encoder 200 may organize (at 204) the constructs based on increasing coordinate values defined as the positional data.

Encoder 200 defines (at 206) the leaf nodes of the tree-based representation according to the organization of the constructs. Each leaf node may represent or correspond to a different construct of the 3D model. In some embodiments, each leaf node may include a pointer to a construct. For instance, the positional elements of each construct may be stored as a pointer that may be used to reference other data (e.g., the non-positional data) of the corresponding construct in the 3D model. In some other embodiments, each leaf node may store the positional and/or non-positional data of a different construct.

Encoder 200 may add parent nodes for the volume or region of space spanned by two or more leaf nodes of the tree. For instance, encoder 200 may partition (at 208) the space that is spanned by the 3D model into equal sized cubes or other volumes of a first size, may create (at 210) a parent node for each cube or volume of the first size, and may link a parent node to one or more leaf nodes based on the positional values for the constructs represented by the one or more leaf nodes falling within the region or volume of space represented by the parent node. If a parent node corresponds to an empty region of space (e.g., no constructs within the cube or volume represented by the parent node), encoder 200 may cull or remove that parent node from the tree or may insert the parent node as an indicator for a region of empty space.

In some embodiments, each parent node is defined with coordinates for the region of the 3D model that is represented by that parent node. In some embodiments, each parent node is defined with indices to the directly or indirectly linked leaf nodes or constructs associated with that parent node. In some embodiments, each parent node is defined with positional data and non-positional data that approximates or is derived from the positional data and non-positional data of the constructs represented by the leaf nodes that are directly or indirectly linked to that parent node. In some such embodiments, the parent node may store positional data and non-positional data that is a compressed, lower resolution, or lesser detailed copy of the data from the constructs represented by the leaf nodes that are directly or indirectly linked to that parent node. For instance, the red, green, and blue ("RGB") color values of a parent node may be the average, mean, median, or other value computed or selected from the children node RGB values. Alternatively, the RGB values of a parent node may be defined as the maximum and minimum RGB values of the children nodes, or as a range of RGB values spanned by the RGB values of the children nodes. Accordingly, the definition of the parent node positional and non-positional data may be a lossy process.

Encoder 200 constructs (at 212 and 214) the tree with higher levels of nodes (e.g., grandparent nodes) that represent cubes or other volumes of a size that is larger than the size of the lower-level nodes. Encoder 200 may continue until the root node encompasses the entirety of the 3D model or the entirety of the space spanned by the constructs of the 3D model.

Each node of the tree-based representation may be assigned a unique identifier. The unique identifier of a particular node may be used to directly access that particular node or to differentiate the particular node from other nodes that are linked to the same parent node and/or that are in the same layer of the tree-based representation. The unique identifier may be defined from positional data, may include a pointer, or may be a unique index or other value.

In some embodiments, encoder 200 may generate the root node first, wherein the root node represents the entirety of the 3D model or the space spanned by the constructs of the 3D model. Encoder 200 may then subdivide the 3D model or the represented space into smaller regions or volumes, and may define children nodes based on the data or constructs within each of the partitioned regions or volumes.

In constructing a binary tree representation of the 3D model, encoder 200 may partition the represented region into two volumes, may define children nodes under the root node for each volume, and may continue subdividing each volume until the leaf nodes corresponding to the individual 3D model constructs are reached. The children nodes may approximate the shapes and colors that are within the represented regions, or may contain pointers, indices, or other references to the individual constructs within the represented regions.

In constructing an octree representation of the 3D model, encoder 200 may partition the entirety of the 3D model or the space spanned by the constructs of the 3D model into eight volumes, and may define children nodes under the root node for each volume. Encoder 200 may continue subdividing each volume into eight smaller volumes, and may continue defining nodes for lower layers of the octree until the leaf nodes corresponding to the individual constructs are reached.

To optimize the tree construction and reduce the potential for empty nodes in the tree. Encoder 200 may construct a K-dimensional ("KD") tree and may partition the particular region of 3D space spanned by a set of constructs into two or more equal or unequal sized volumes. The size and/or shape of each volume may be determined by the number of constructs, parent nodes, or children nodes that fall within that volume. For instance, encoder 200 may expand the size of a volume when the volume corresponds to an empty space or encompasses fewer than one child node or one construct.

To optimize searching and data access within any tree-based representation of a dataset (e.g., binary tree, octree, KD tree, etc.), encoder 200 integrates a graph structure to each layer of the tree-based representation. The graph structure enables the lateral access within each layer of the tree-based representation such that any one node in a given layer may be accessed from any other node in that given layer even if the nodes are connected to different parent nodes without upward or downward traversals of the tree-based representation to access the different nodes in the same layer.

Figure 3:
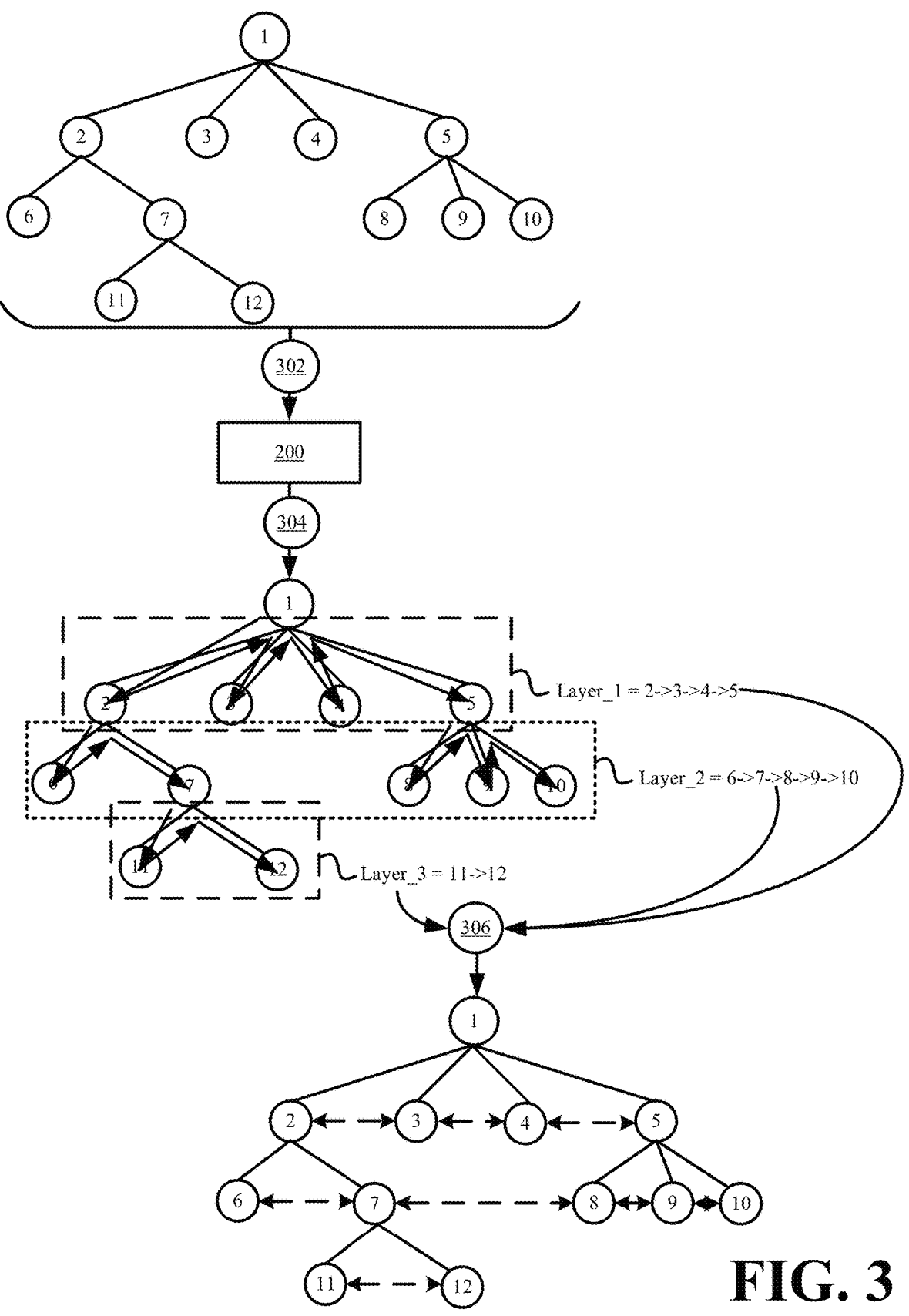
FIG. 3 illustrates an example of integrating a graph structure for lateral access between nodes in a common layer of a tree-based representation in accordance with some embodiments presented herein.

FIG. 3 illustrates an example of integrating a graph structure for lateral access between nodes in a common layer of a tree-based representation in accordance with some embodiments presented herein. Encoder 200 receives (at 302) the tree-based representation of a 3D model or other dataset.

Encoder 200 performs (at 304) a breadth-first search to detect the nodes at each layer of the tree-based representation. For instance, encoder 200 may obtain the pointer, index, reference, or other identifier for each node in a given layer of the tree-based representation. The identifier may be used to access the node that is associated with that identifier.

Encoder 200 generates (at 306) the graph structure for each layer using the identifiers of nodes detected at each layer of the tree-based representation. The graph structure groups the pointer, index, reference, or other identifier of each node in a given layer so that the identifier of one node in a particular layer is associated with and may be used to access the identifier of any other node in that particular layer without upward or downward traversals of the tree-based representation.

Encoder 200 may generate (at 306) the graph structure according to any one of several different definitions. For instance, the graph structure and/or the lateral linking of nodes in each layer may be defined as a set of pointers, a linked list, a hash map, or other connected structure. Generating (at 306) the graph structure may also include different integrations of the graph structure definition to one or more nodes of a given layer.

Figure 4:
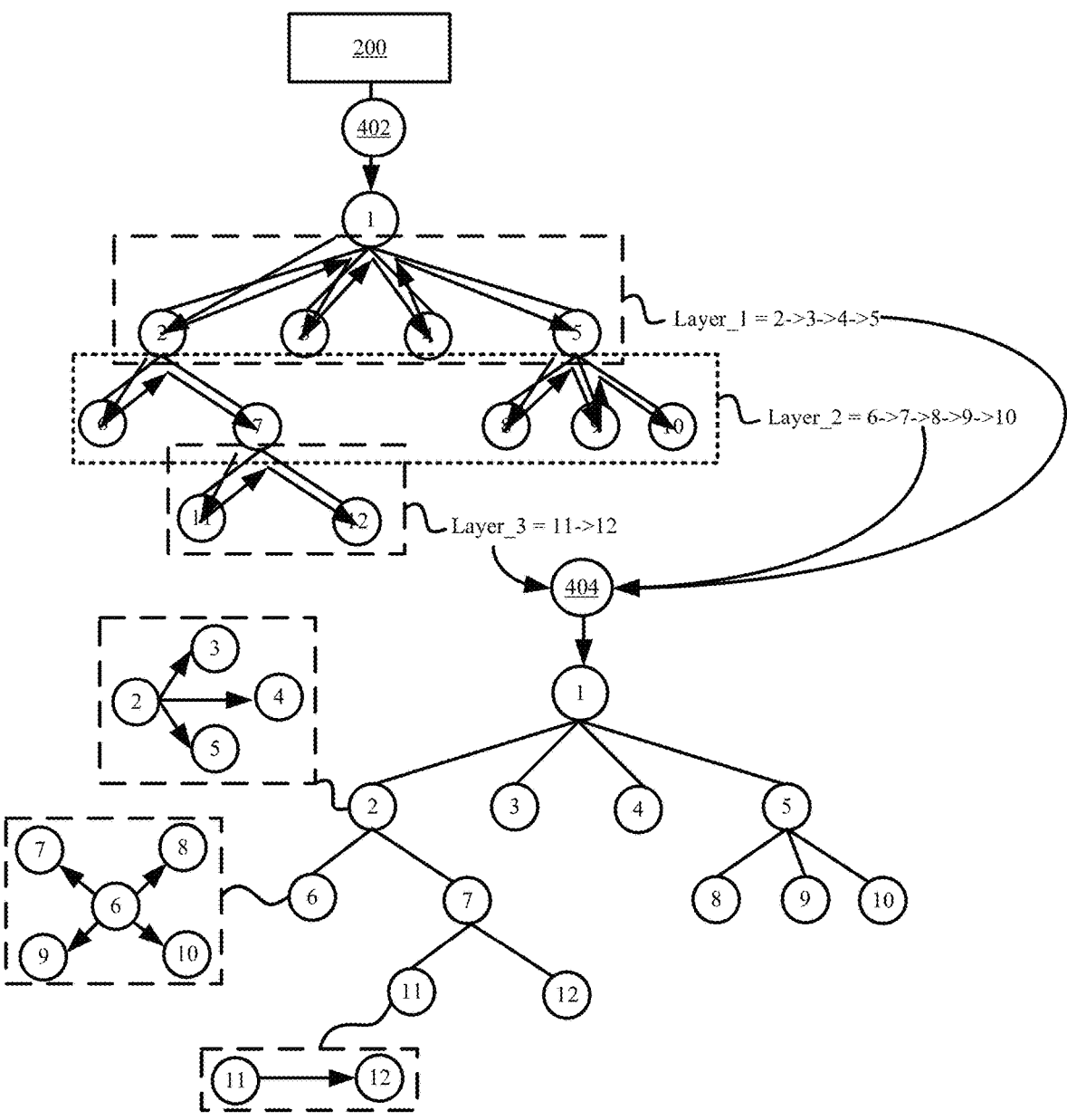
FIG. 4 illustrates an example of generating and integrating a graph structure to a first node in each layer of a tree-based representation in accordance with some embodiments presented herein.

FIG. 4 illustrates an example of generating and integrating a graph structure to a first node in each layer of a tree-based representation in accordance with some embodiments presented herein. Encoder 200 performs (at 402) the breadth-first search to identify all nodes at each layer of the tree-based representation.

Encoder 200 selects the first node or the leftmost node in a given layer, and encodes (at 404) the selected node with an array having the pointers, indices, references, or other identifiers of the other nodes in that given layer. The array provides the data for selecting any node in a given layer after accessing and reading the data that is encoded to the first node in that given layer.

In some embodiments, the first node is the first node at each layer of the tree-based representation that is accessed via a breadth-first search, depth-first search, or other sequential or deterministic traversal of the tree-based representation. In some embodiments, the array is defined as a linked list of the pointers or identifiers for the nodes detected within a given layer of the tree-based representation.

Searching the graph-integrated tree-based representation of FIG. 4 or another graph-integrated tree-based representation includes performing a single downward traversal from the root node to the first node in a layer that contains a desired node. For instance, encoder 200 may receive a query for data at a particular resolution, in a particular sized region, a selection of a set of constructs that are directly or indirectly linked to a node in the selected layer, and/or other criteria that is satisfied or represented by the selected layer. Encoder 200 may then perform a lateral traversal of the nodes within the selected layer to identify the specific node that contains the queried for data.

In some embodiments, an array may be defined for each node in a layer. In some such embodiments, encoder 200 generates a graph structure in which each node may directly access any other node in the same layer without having to reference back to the first node.

In some other embodiments, the graph structure may be integrated as part of each layer of the tree-based representation rather than any particular node. For instance, encoder 200 may define the graph structure for each layer of the tree-based representation that includes the identifier for each node in a given layer and vertices to the identifier of all other nodes in that given layer.

Figure 5:
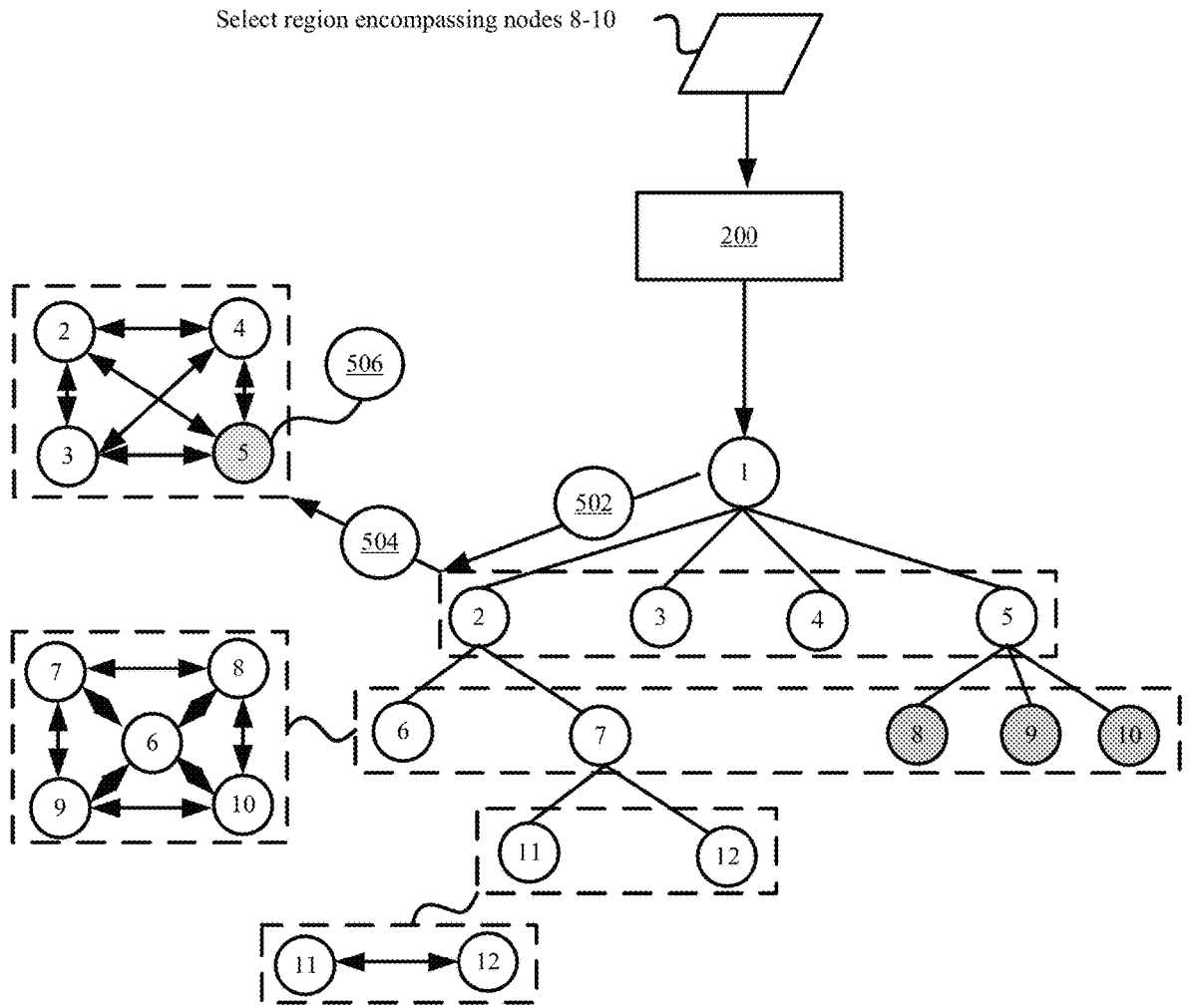
FIG. 5 illustrates an example of integrating the graph structure with each layer of the tree-based representation in accordance with some embodiments.

FIG. 5 illustrates an example of integrating the graph structure with each layer of the tree-based representation in accordance with some embodiments. Searching the graph-integrated tree-based representation of FIG. 5 includes traversing (at 502) down from the root node to a particular layer that represents subdivided regions of the 3D model containing the desired data, the desired data at a specific resolution or level-of-detail, and/or the data that is representative of a searched for set of constructs. However, rather than select a first node in the particular layer, the search may obtain (at 504) the graph structure that is defined for that particular layer. The search continues by selecting (at 506) a desired node from the particular layer via a lateral traversal that is identified from the node identifiers and vertices of the obtained graph structure. In some embodiments, encoder 200 may analyze the data associated with each node in the particular layer to determine if the associated data satisfies the search criteria or search query parameters.

Figure 6:
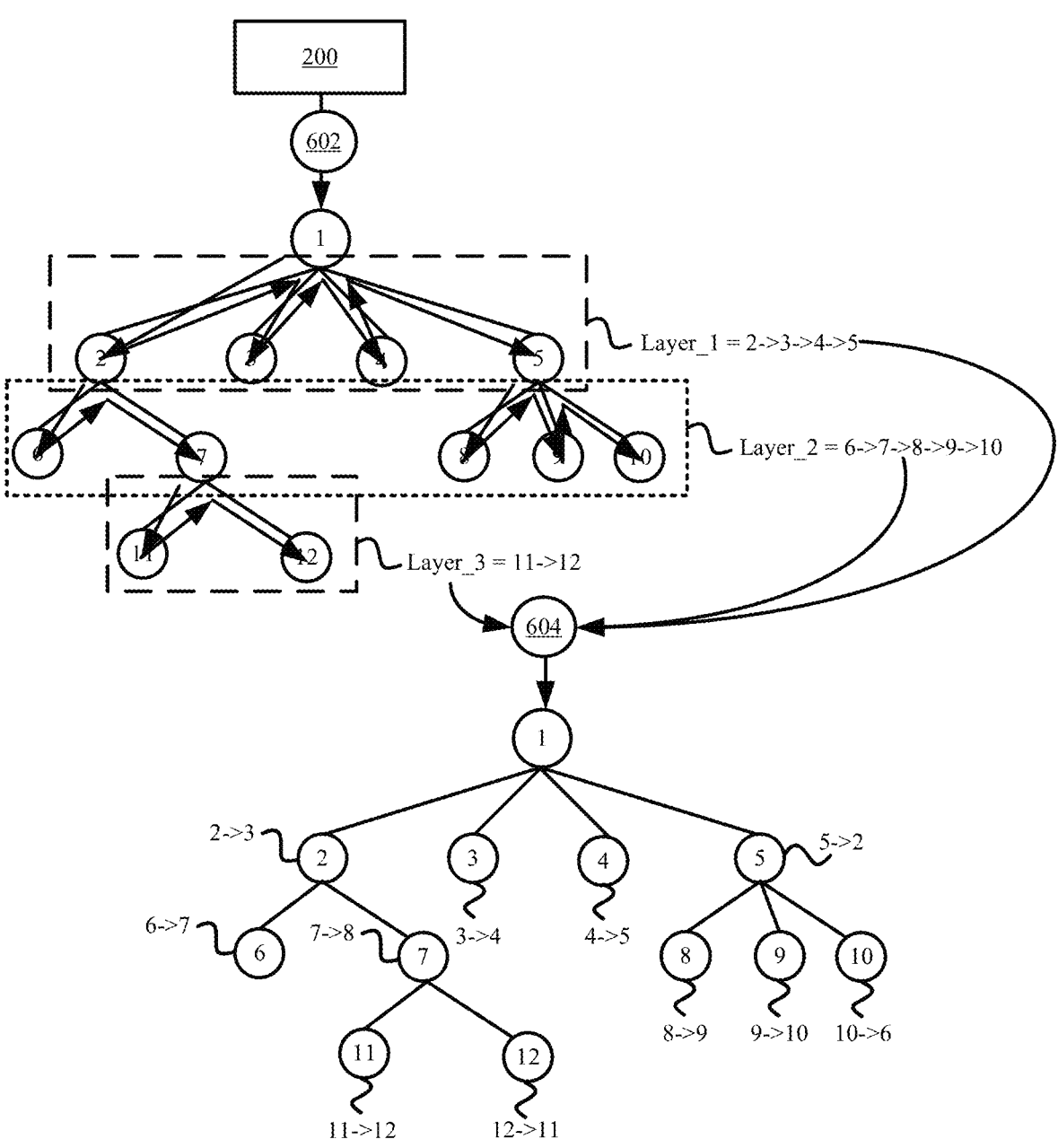
FIG. 6 illustrates an example of generating and integrating a graph structure using pointers between nodes in a given layer in accordance with some embodiments presented herein.

FIG. 6 illustrates an example of generating and integrating a graph structure using pointers between nodes in a given layer in accordance with some embodiments presented herein. Here again, encoder 200 may perform (at 602) a breadth-first search to identify all nodes at each layer of the tree-based representation.

Encoder 200 defines (at 604) a pointer for each node in a given layer. The pointer points to and may be used to access a next node that is discovered in that given layer via the breadth-first search. The pointer of the last node in the given layer is defined with the identifier and/or pointer of the first node in the given layer, thereby forming a circular path of pointers for laterally traversing and/or accessing each node in that given layer.

In some embodiments, the pointer to the next node may be stored as part of the current node data or definition. In some other embodiments, the pointers may be stored as part of the node metadata.

Figure 7:
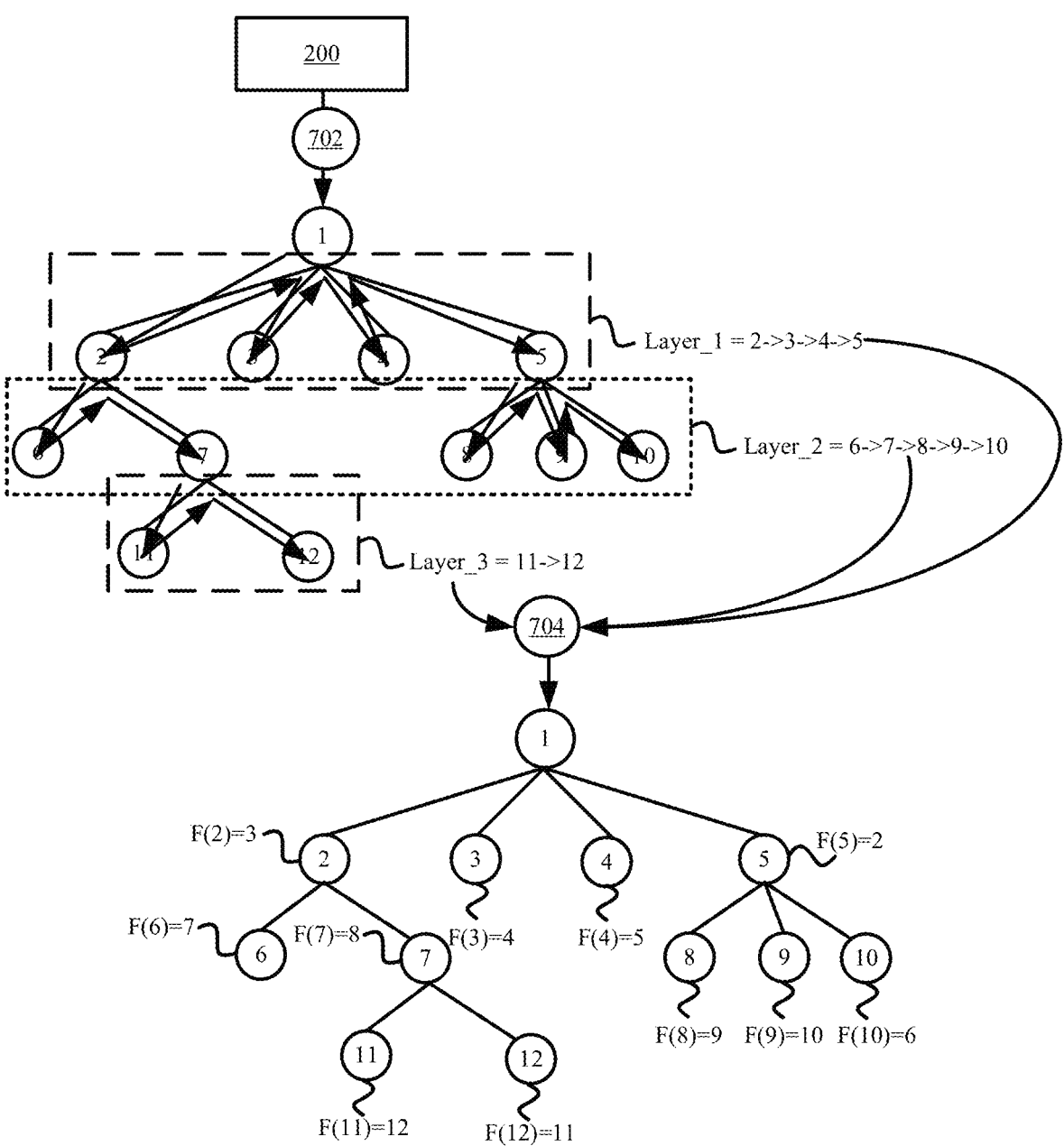
FIG. 7 illustrates an example of generating and integrating a graph structure to a tree-based representation based on a hash map in accordance with some embodiments presented herein.

FIG. 7 illustrates an example of generating and integrating a graph structure to a tree-based representation based on a hash map in accordance with some embodiments presented herein. Encoder 200 traverses (at 702) the tree-based representation to identify the nodes at each layer.

Encoder 200 defines (at 704) a hash function for the hash map that hashes a key into an index. In some embodiments, the key may be an identifier that is associated with each layer of the tree-based representation. In some such embodiments, the hash function hashes the layer identifier and returns the indices for accessing each node in the identified layer. In some embodiments, the key may be the identifier of the first node in a particular layer. The index returned by the hash function may be the identifier for a next node in the particular layer. In some such embodiments, the index may be used to access the represented node in the selected layer, or may be hashed to obtain the index for a next node in that selected layer.

The hash map may correspond to a map data structure (e.g., a dictionary, an associative array, etc.) The map data structure may store a collection of key-value pairs, where each key is associated with a single value that is used access a different node in a particular layer.

Encoder 200 performs a lateral traversal of the nodes in a particular layer of the tree-based representation by hashing the key defined for the particular layer and each index returned by the hashing function until a desired node in the particular layer is accessed. For instance, encoder 200 may analyze the node data associated with each returned index to determine if the node data contains the desired data to satisfy a search query or is directly or indirectly linked to leaf nodes encompassing a selection. If not, encoder 200 may hash the index of the current node accessed in the particular layer to access the next node in the same particular layer that may have the same parent node or a different parent node than the current node.

FIG. 8 presents a process 800 for generating a tree-based representation of a 3D model in which the nodes at any particular layer are laterally traversable in accordance with some embodiments presented herein. Process 800 is implemented by encoder 200.

Encoder 200 may include one or more devices or machines with processor, memory, storage, network, and/or other hardware resources for processing, rendering, editing, viewing, and/or otherwise accessing 3D models. Specifically, encoder 200 adapts the one or more devices or machines to encode the 3D models as graph-integrated tree-based representations that may be traversed vertically and laterally to access any node of the tree-based representation in O(1) time. The data of the accessed node may be modified or the accessed node may be repositioned to a different layer or parent node of the tree-based representation after performing the lateral searching within a layer of the graph-integrated tree-based representation.

Process 800 includes receiving (at 802) a dataset with a particular formatting. For instance, the dataset may include data of a 3D model, such as points, polygons, or other constructs, that collectively create a 3D object. The data may be defined sequentially in the 3D model file based on positional coordinates of the constructs. In some embodiments, the 3D model data is defined in the file without a tree-based hierarchical organization or association.

Process 800 includes generating (at 804) a tree-based representation for the dataset. Generating (at 804) the tree-based representation may include defining a binary tree, octree, KD tree, or other tree organization of the dataset. Encoder 200 may partition or subdivide the dataset into smaller and smaller subsets of data, and defining different layers of the tree-based representation based on the data included in the smaller and smaller subset of data.

For instance, generating (at 804) the tree-based representation includes selecting the entire space spanned by the dataset, defining a root node for the tree-based representation that accesses or encompasses the entire dataset, subdividing the space into two or eight partitioned regions that encompass different subsets of data, defining a second layer of the tree-based representation with two or eight nodes that represent each of the subdivided or partitioned regions, and further subdividing each of the partitioned regions to define additional layers of the tree-based representation until each partitioned region represents a single construct or subset of data that includes only a single data element for a leaf node of the tree-based representation.

In some other embodiments, encoder 200 may generate (at 804) the tree-based representation starting with the leaf nodes. For instance, encoder 200 may define a leaf node for each defined construct or data element in the dataset. Encoder 200 may then define a parent node to represent different pairs or different subsets of leaf nodes. The parent node may be defined with positional and non-positional values that are derived from or that approximate the positional and non-positional values of the associated leaf nodes. Encoder 200 may continue defining higher layers of the tree-based representation in this manner until reaching and defining the root node.

Process 800 includes determining (at 806) the nodes at each layer of the tree-based representation. Specifically, encoder 200 may determine (at 806) the indices for the nodes at each layer, wherein the indices are the identifiers associated with and/or that are used to access each of the nodes in a layer. Encoder 200 may perform a breadth-first traversal of the tree-based representation to determine (at 806) the nodes at each layer, and may store the indices used to identify or access the nodes. In some embodiments, encoder 200 performs other traversals (e.g., depth-first search) to detect the nodes within each layer of the tree-based representation.

Process 800 includes defining (at 808) a graph structure for laterally traversing the nodes determined (at 806) to be in each layer of the tree-based representation. Encoder 200 may define (at 808) the graph structure according to any of the embodiments described above with reference to FIGS. 4-7 or other techniques. Defining (at 808) the graph structure includes interlinking or connecting the nodes in each layer so that any one node in a layer is linked or connected to at least one other node in the same layer or to all other nodes in the same layer. The graph structure may be defined (at 808) using pointers, linked lists, hash maps, or other connected data structures. For instance, encoder 200 may add a pointer to each node in a particular layer, and the node may be used to access a next node in the particular layer. The pointer may specify the index or another identifier for directly accessing the next node.

Process 800 includes generating (at 810) the graph-integrated tree-based representation by integrating the graph structure that is defined for each layer of the tree-based representation to at least one node of the corresponding layer. The graph-integrated tree-based representation may be stored to a file that is output from encoder 200 or that is provided to an application, device, or other service that performs fast data access by leveraging the lateral traversals to access nodes within the graph-integrated tree-based representation in O(1) time. Generating (at 810) the graph-integrated tree-based representation may include storing the defined (at 808) graph structure as metadata of the tree-based representation or may include data storing the defined (at 808) graph structure within one or more at each layer of the tree-based representation.

Figure 9:
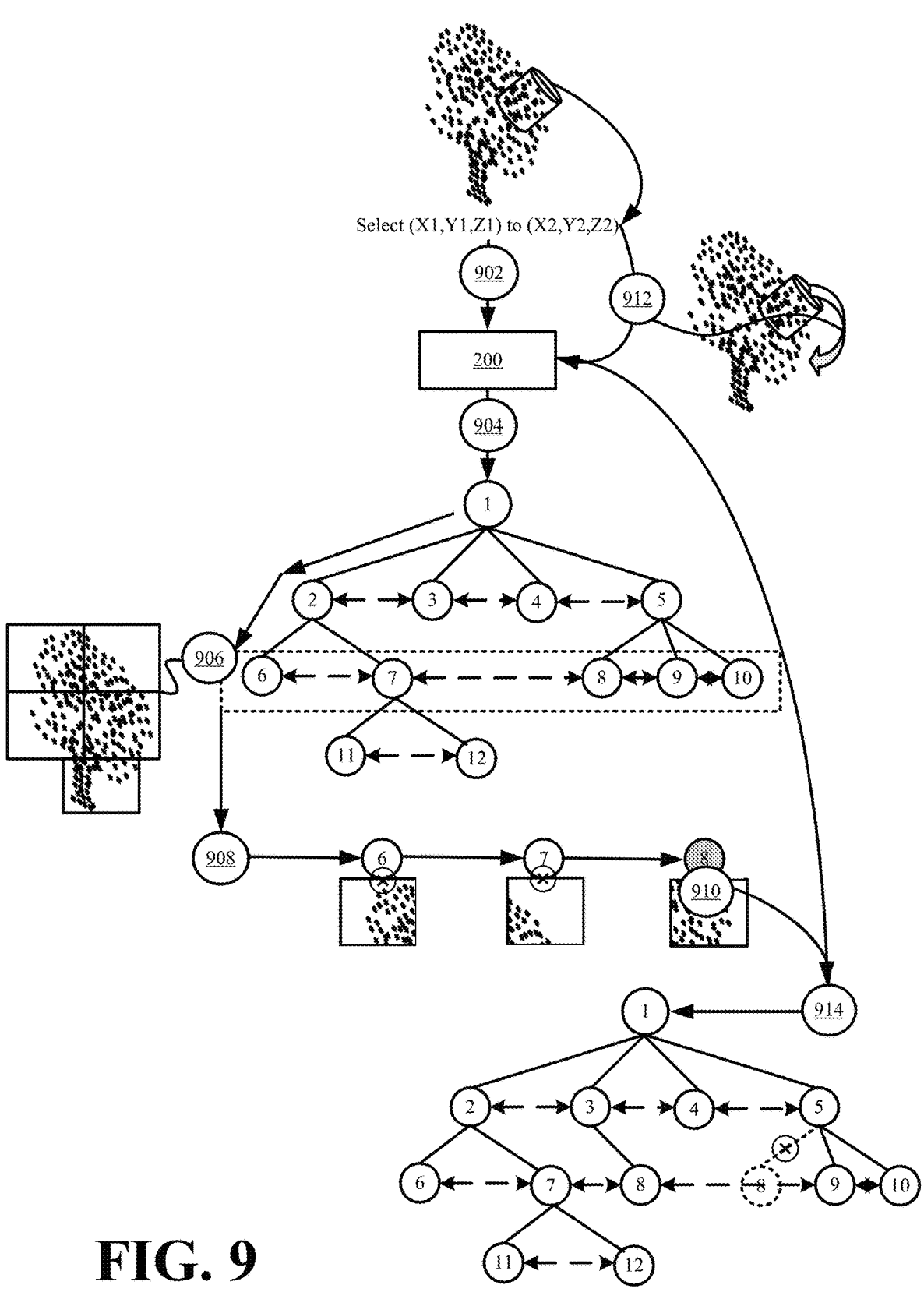
FIG. 9 illustrates an example of directly accessing data from the graph-integrated tree-based representation with vertical and lateral traversals in accordance with some embodiments presented herein.

FIG. 9 illustrates an example of directly accessing data from the graph-integrated tree-based representation with vertical and lateral traversals in accordance with some embodiments presented herein. Encoder 200 receives (at 902) a request to access specific set of data from a 3D model. The request may specify moving a virtual camera position or viewport from one region to a new region. The request may be associated with a set of coordinates for the virtual camera position or for the boundaries of the viewport, and the specific set of data may include the data that falls within the viewport or the field-of-view at the virtual camera position. In some embodiments, encoder 200 determines the viewport coordinates by computing the field-of-view associated with the virtual camera position. In some other embodiments, the request may specify a selection of a subset of data or a subset of constructs from the 3D model. In some such embodiments, the selection may specify indices that identify each data element of the subset of data, or may specify coordinates for the selected region.

Encoder 200 retrieves (at 904) the graph-integrated tree-based representation of the 3D model. Retrieving (at 904) the graph-integrated tree-based representation may include loading the hierarchical organization of nodes that represent the 3D model data into memory without loading the data associated with each construct of the 3D model. In some embodiments, retrieving (at 904) the graph-integrated tree-based representation may include generating the graph structure for each layer of tree-based representation, wherein the graph structure identifies the nodes in each layer as well as region or volume represented by each node or the subset of constructs that are directly or indirectly linked to the node.

Encoder 200 performs (at 906) a downward traversal from the root node of the graph-integrated tree-based representation to a first node in a particular layer of the graph-integrated tree-based representation that encompasses the requested specific set of data. In some embodiments, encoder 200 traverses down from the root node until reaching a layer in which the nodes represent volumes or regions equivalent to, greater than, or smaller than the region for the field-of-view, viewport, or boundaries of a selected region. In some other embodiments, encoder 200 traverses down from the root node until reaching a layer in which individual nodes or some combination of nodes are directly or indirectly linked to the leaf nodes corresponding to the specific set of data and not other leaf nodes.

Encoder 200 performs (at 908) a lateral traversal of the nodes in the particular layer using the graph structure that is defined for that particular layer. Performing (at 908) the lateral traversal includes starting at a first node in the particular layer, and selecting a next node in the particular layer based on a pointer, index, linked list, or hash map that links the next node to the first node even if the first node and next node in the particular layer have different parent nodes. Performing (at 908) the lateral traversal includes selecting the next node in the particular layer until arriving at the one or more nodes in the particular layer that represent volumes or regions equivalent to, greater than, or smaller than the region for the field-of-view, viewport, or boundaries of a selected region, or that are directly or indirectly linked to the leaf nodes corresponding to the specific set of data and not other leaf nodes.

Encoder 200 selects (at 910) the one or more nodes in the particular layer that satisfy the request or from which the specific set of data that was requested may be accessed. Specifically, encoder 200 selects (at 910) one or more parent nodes that are directly or indirectly linked to the leaf nodes corresponding to the specific set of data that the user has selected via a manual selection or that is selected based on a camera or viewport adjustment.

Encoder 200 receives (at 912) input for editing the selection. The input may specify repositioning the specific set of data from one part of the 3D model to another, or adjusting the positional or non-positional elements of the specific set of data.

In response to input that moves the specific set of data, encoder 200 detaches the selected (at 910) one or more nodes from their respective parent nodes, and reattaches (at 914) the selected (at 910) one or more nodes under a new parent node that represents or encompasses the region where the specific set of data is moved to. The data is moved with a single operation using the graph-integrated tree-based representation.

In response to input that adjusts color values of the specific set of data, encoder 200 applies the adjustment to the selected (at 910) one or more nodes which then causes the adjustments to apply to the leaf nodes that are directly or indirectly linked to the selected (at 910) one or more nodes. In other words, encoder 200 may traverse down from the selected (at 910) one or more nodes to the connected leaf nodes, and may apply the color adjustments to the constructs or 3D model data associated with each of the connected leaf nodes.

The graph-integrated tree-based representation enables the fast dynamic loading of selective data from the 3D model. Continuing with the example of FIG. 9, the input may cause encoder 200 to load and/or render just the part of the 3D model that is within the selection (e.g., the specific set of data) rather than all the 3D model data. Specifically, encoder 200 may perform a single downward traversal and the lateral traversal to select (at 910) the one or more nodes that are directly or indirectly linked only to the leaf nodes for the specific set of data, and may load into memory and/or render the data associated with the selected (at 910) one or more nodes. In other words, rather than load in all data of the 3D model in order to select and isolate the specific set of data, encoder 200 may instead load and search the graph-integrated tree-based representation of the 3D model to select and render just the specific set of data.

Figure 10:
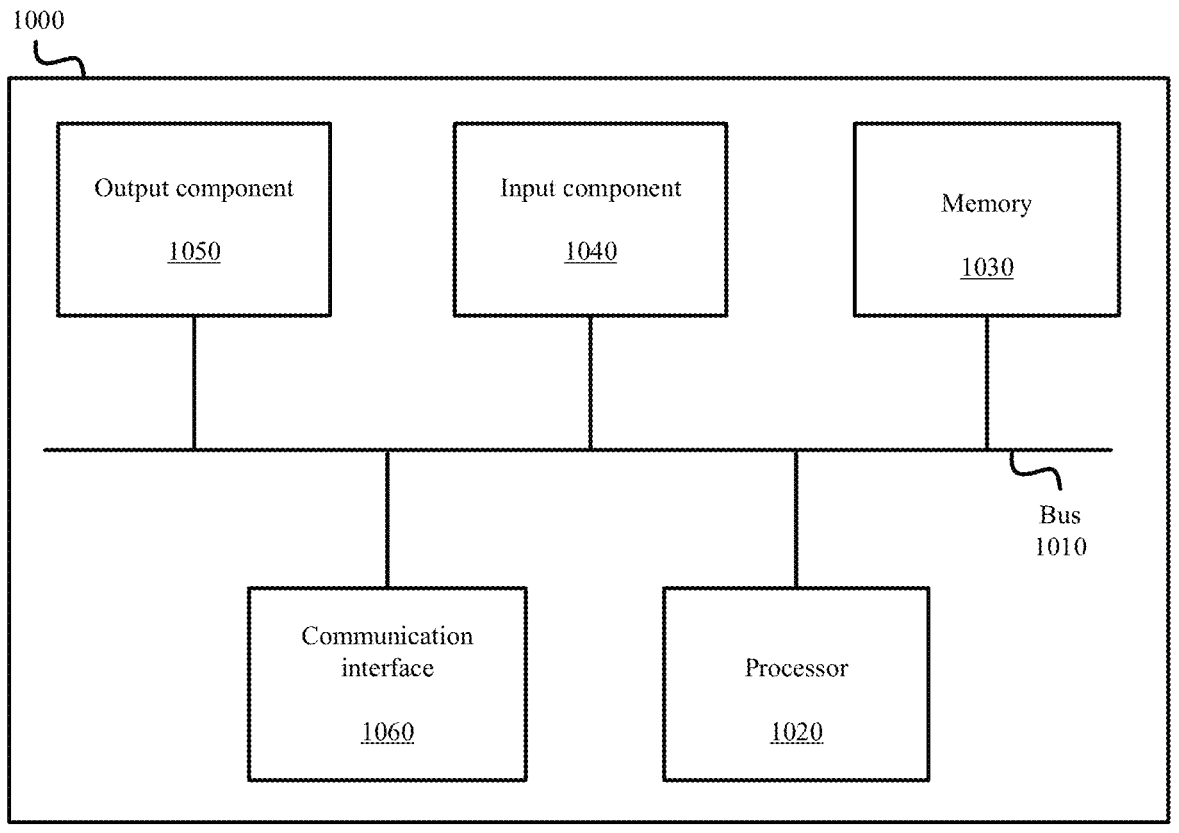
FIG. 10 illustrates example components of one or more devices, according to one or more embodiments described herein.

FIG. 10 is a diagram of example components of device 1000. Device 1000 may be used to implement one or more of the devices or systems described above (e.g., encoder 200). Device 1000 may include bus 1010, processor 1020, memory 1030, input component 1040, output component 1050, and communication interface 1060. In another implementation, device 1000 may include additional, fewer, different, or differently arranged components.

Bus 1010 may include one or more communication paths that permit communication among the components of device 1000. Processor 1020 may include a processor, microprocessor, or processing logic that may interpret and execute instructions. Memory 1030 may include any type of dynamic storage device that may store information and instructions for execution by processor 1020, and/or any type of non-volatile storage device that may store information for use by processor 1020.

Input component 1040 may include a mechanism that permits an operator to input information to device 1000, such as a keyboard, a keypad, a button, a switch, etc. Output component 1050 may include a mechanism that outputs information to the operator, such as a display, a speaker, one or more LEDs, etc.

Communication interface 1060 may include any transceiver-like mechanism that enables device 1000 to communicate with other devices and/or systems. For example, communication interface 1060 may include an Ethernet interface, an optical interface, a coaxial interface, or the like. Communication interface 1060 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1000 may include more than one communication interface 1060. For instance, device 1000 may include an optical interface and an Ethernet interface.

Device 1000 may perform certain operations relating to one or more processes described above. Device 1000 may perform these operations in response to processor 1020 executing software instructions stored in a computer-readable medium, such as memory 1030. A computer-readable medium may be defined as a non-transitory memory device. A memory device may include space within a single physical memory device or spread across multiple physical memory devices. The software instructions may be read into memory 1030 from another computer-readable medium or from another device. The software instructions stored in memory 1030 may cause processor 1020 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

For example, while series of messages, blocks, and/or signals have been described with regard to some of the above figures, the order of the messages, blocks, and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

The invention claimed is:

1. A method comprising:

receiving a request to access a particular subset of data from a dataset that is stored on a non-volatile storage device;

loading a tree-based representation that hierarchically organizes data from the dataset into a device memory without loading the data of the dataset from the non-volatile storage device into the device memory;

defining a graph structure for each layer of a plurality of layers of the tree-based representation, wherein defining the graph structure comprises connecting a different plurality of nodes at each layer of the plurality of layers for direct lateral access across the different plurality of nodes;

searching the tree-based representation for a location of the particular subset of data in the dataset with a constant time complexity by:

traversing downward from a root node of the tree-based representation to a particular layer of the plurality of layers under the root node, the particular layer comprising a plurality of nodes with one or more nodes of the plurality of nodes in the particular layer encompassing the particular subset of data, wherein the plurality of nodes in the particular layer are linked to different parent nodes in a layer of the tree-based representation that is directly above the particular layer; and traversing laterally from a first node of the plurality of nodes in the particular layer to the one or more nodes in the particular layer based on the graph structure that is defined for the particular layer and that links the plurality of nodes in the particular layer for the direct lateral access; and selectively accessing the particular subset of data from the non-volatile storage device in the constant time complexity without accessing or searching other data from the dataset based on the searching of the tree-based representation in the device memory and data that is associated with a set of leaf nodes that are in one or more layers under the particular layer and that are directly or indirectly linked to the one or more nodes, wherein selectively accessing the particular subset of data comprises loading the particular subset of data from the non-volatile storage device into the device memory in less time than searching the dataset with a depth-first search or a breadth-first search.

2. The method of claim 1, wherein traversing downward comprises:

determining that the one or more nodes in the particular layer represent partitioned regions of a space, wherein the dataset is defined within the space and the particular subset of data is defined within the partitioned regions of the space represented by the one or more nodes; and halting said traversing downward in response to determining that the one or more nodes represent the partitioned regions that encompass the particular subset of data.

3. The method of claim 1, wherein traversing downward comprises:

determining that the one or more nodes in the particular layer are directly or indirectly linked to the set of leaf nodes that contain the particular subset of data and are not directly or indirectly linked to other leaf nodes that contain other data from the dataset; and halting said traversing downward in response to determining that the one or more nodes are directly or indirectly linked to the set of leaf nodes.

4. The method of claim 1, wherein traversing downward comprises:

selecting a different first node that is defined in each layer of two or more of the plurality of layers under the root node; and determining that the different first node of the particular layer contains data for a partitioned region that is equal in size to a region spanned by the particular subset of data.

5. The method of claim 1, wherein traversing laterally comprises:

selecting the first node of the plurality of nodes in the particular layer;

determining that the first node is not associated with data in the particular subset of data; and selecting a second node of the plurality of nodes in the particular layer, that is linked to a different parent node than the first node, based on a link defined between the first node and the second node.

6. The method of claim 5, wherein traversing laterally further comprises:

determining that the second node is associated with a first part of the particular subset of data; and accessing the first part of the particular subset of data from nodes that are directly or indirectly linked to the second node in layers of the tree-based representation that are below the particular layer.

7. The method of claim 6, wherein traversing laterally further comprises:

selecting a third node of the plurality of nodes in the particular layer that is linked to a different parent node than the second node based on a link defined between the second node and the third node;

determining that the third node is associated with a second part of the particular subset of data; and accessing the second part of the particular subset of data from nodes that are directly or indirectly linked to the third node in the layers of the tree-based representation that are below the particular layer.

8. The method of claim 1, wherein traversing laterally comprises:

retrieving the graph structure that is defined for the plurality of nodes in the particular layer; and selecting different nodes from the plurality of nodes based on associations defined between the plurality of nodes in the graph structure.

9. The method of claim 1, wherein traversing laterally comprises:

selecting the first node of the plurality of nodes in the particular layer;

determining that the first node is directly or indirectly linked to two or more nodes in lower layers of the tree-based representation that do not contain data from the particular subset of data;

selecting a second node of the plurality of nodes in the particular layer based on a link between the first node and the second node;

determining that the second node is directly or indirectly linked to at least one node in the lower layers of the tree-based representation that contains data from the particular subset of data; and returning the data contained in the at least one node in response to the request.

10. The method of claim 9, wherein traversing laterally further comprises:

determining that the data contained in the at least one node in the lower layers of the tree-based representation is less than all the data in the particular subset of data;

selecting a third node of the plurality of nodes in the particular layer based on a link between the third node and one or more other nodes in the plurality of nodes;

determining that the third node is directly or indirectly linked to at least one other node in the lower layers of the tree-based representation that contains remaining data from the particular subset of data; and returning the remaining data contained in the at least one other node in response to the request.

11. The method of claim 1, wherein traversing laterally comprises:

obtaining a linked list of identifiers that are defined as part of the first node, wherein the linked list of identifiers comprises an identifier for directly accessing each node of the plurality of nodes in the particular layer; and directly accessing the one or more nodes from the first node based on the linked list of identifiers.

12. The method of claim 1, wherein traversing laterally comprises:

obtaining a pointer that is defined as part of the first node, wherein the pointer provides a link to access a second node of the plurality of nodes in the particular layer; and directly accessing the second node from the first node by following the pointer.

13. The method of claim 1 further comprising:

determining that the particular subset of data is stored in the set of leaf nodes; and wherein traversing downward comprises selecting a different first node that is defined in each layer of two or more of the plurality of layers under the root node until reaching the first node of the particular layer that spans a region equivalent to a region spanned by the particular subset of data.

14. The method of claim 1, wherein selectively accessing the particular subset of data further comprises:

rendering the particular subset of data that is loaded into the device memory; and generating a visualization of a three-dimensional (3D) model from a particular field-of-view that is specified in the request in response to rendering the particular subset of data.

15. The method of claim 14, wherein receiving the request comprises:

tracking a position of a virtual camera in a 3D space of the 3D model; and receiving a query for presenting the 3D model from the particular field-of-view that is generated from the position of the virtual camera.

16. The method of claim 1, wherein receiving the request comprises receiving a query with search criteria for selecting the particular subset of data; and wherein presenting the particular subset of data further comprises responding to the search query in O(1) time with the particular subset of the data that satisfies the search criteria.

17. The method of claim 1 further comprising:

executing a search of the dataset that selects the particular subset of data from the dataset in O(1) time in response to said traversing downward from the root node comprising a single vertical traversal of the tree-based representation to the particular layer and said traversing laterally from the first node comprising a single lateral traversal of the tree-based representation to the one or more nodes in the particular layer.

18. The method of claim 1, wherein receiving the request comprises receiving a request for a region of a particular size in a 3D model;

wherein traversing downward from the root node comprises determining that nodes that are accessible from the particular layer represent different regions of the 3D model of at least the particular size;

wherein traversing laterally from the first node comprises selecting the one or more nodes in particular layer that contain data for the region specified in the request; and wherein presenting the particular subset of data further comprises presenting a graphical representation for the region of the particular size in the 3D model by rendering the data contained in the one or more nodes.

19. A data access system comprising:

a memory;

a non-volatile storage device;

one or more hardware processors configured to:

receive a request to access a particular subset of data from a dataset that is stored on the non-volatile storage device;

load a tree-based representation that hierarchically organizes data from the dataset into the memory without loading the data of the dataset from the non-volatile storage device into the device memory;

define a graph structure for each layer of a plurality of layers of the tree-based representation, wherein defining the graph structure comprises connecting a different plurality of nodes at each layer of the plurality of layers for direct lateral access across the different plurality of nodes;

search the tree-based representation for a location of the particular subset of data in the dataset with a constant time complexity by:

traverse downward from a root node of the tree-based representation to a particular layer of the plurality of layers under the root node, the particular layer comprising a plurality of nodes with one or more nodes of the plurality of nodes in the particular layer encompassing the particular subset of data, wherein the plurality of nodes in the particular layer are linked to different parent nodes in a layer of the tree-based representation that is directly above the particular layer; and traverse laterally from a first node of the plurality of nodes in the particular layer to the one or more nodes in the particular layer based on the graph structure that is defined for the particular layer and that links the plurality of nodes in the particular layer for the direct lateral access; and selectively access the particular subset of data from the non-volatile storage device in the constant time complexity without accessing or searching other data from the dataset based on the searching of the tree-based representation in the device memory and data that is associated with a set of leaf nodes that are in one or more layers under the particular layer and that are directly or indirectly linked to the one or more nodes, wherein selectively accessing the particular subset of data comprises loading the particular subset of data from the non-volatile storage device into the device memory in less time than searching the dataset with a depth-first search or a breadth-first search.

20. A non-transitory computer-readable medium storing program instructions that, when executed by one or more hardware processors of a data access system, cause the data access system to perform operations comprising:

receiving a request to access a particular subset of data from a dataset that is stored on a non-volatile storage device;

loading a tree-based representation that hierarchically organizes data from the dataset into a device memory without loading the data of the dataset from the non-volatile storage device into the device memory;

defining a graph structure for each layer of a plurality of layers of the tree-based representation, wherein defining the graph structure comprises connecting a different plurality of nodes at each layer of the plurality of layers for direct lateral access across the different plurality of nodes;

searching the tree-based representation for a location of the particular subset of data in the dataset with a constant time complexity by:

traversing downward from a root node of the tree-based representation to a particular layer of the plurality of layers under the root node, the particular layer comprising a plurality of nodes with one or more nodes of the plurality of nodes in the particular layer encompassing the particular subset of data, wherein the plurality of nodes in the particular layer are linked to different parent nodes in a layer of the tree-based representation that is directly above the particular layer; and traversing laterally from a first node of the plurality of nodes in the particular layer to the one or more nodes in the particular layer based on the graph structure that is defined for the particular layer and that links the plurality of nodes in the particular layer for the direct lateral access; and selectively accessing the particular subset of data from the non-volatile storage device in the constant time complexity without accessing or searching other data from the dataset based on the searching of the tree-based representation in the device memory and data that is associated with a set of leaf nodes that are in one or more layers under the particular layer and that are directly or indirectly linked to the one or more nodes, wherein selectively accessing the particular subset of data comprises loading the particular subset of data from the non-volatile storage device into the device memory in less time than searching the dataset with a depth-first search or a breadth-first search.

* * * * *